T. J. CALLAHAN.
SILL JOINT FOR CUT-TO-FIT GREENHOUSES.
APPLICATION FILED JUNE 27, 1917.
1,335,554. Patented Mar. 30, 1920.
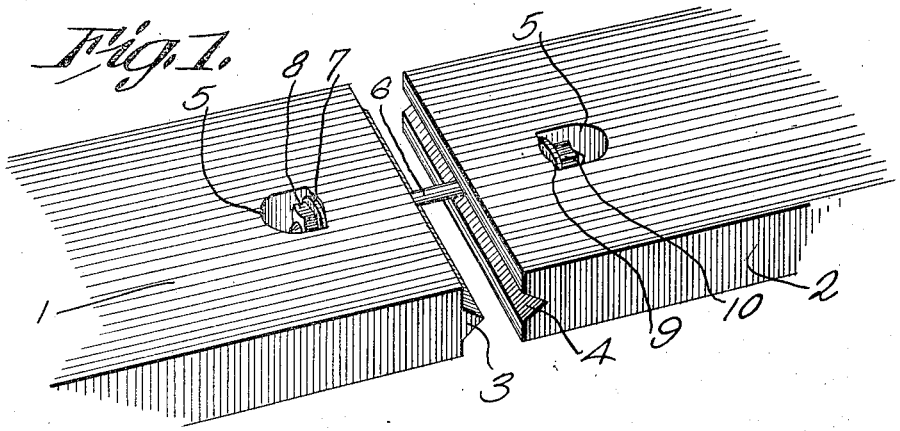
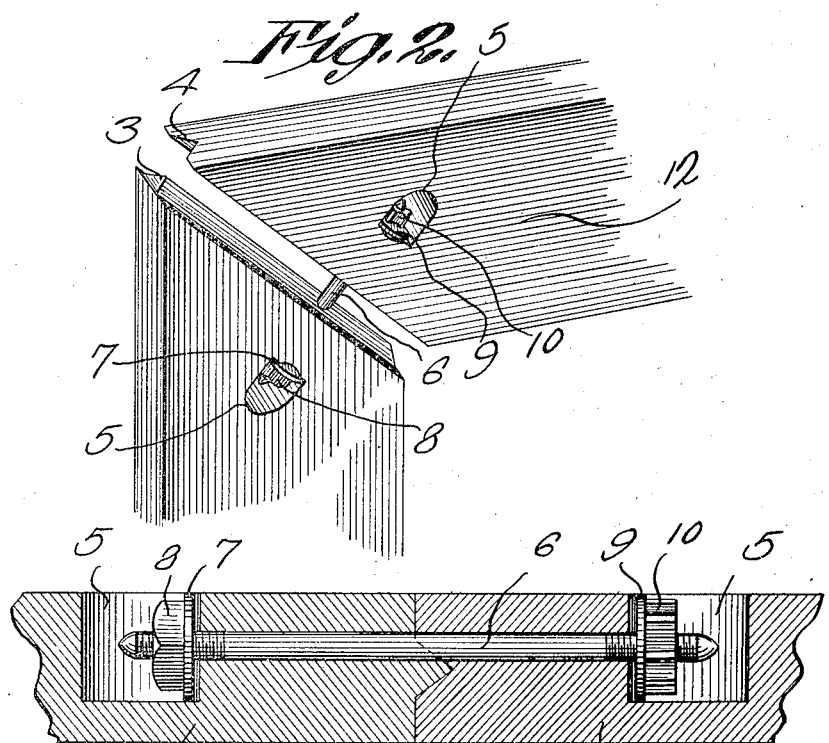

UNITED STATES PATENT OFFICE.

THOMAS J. CALLAHAN, OF DAYTON, OHIO.

SILL-JOINT FOR CUT-TO-FIT GREENHOUSES.

1,335,554.   Specification of Letters Patent.   Patented Mar. 30, 1920.

Application filed June 27, 1917. Serial No. 177,171.

*To all whom it may concern:*

Be it known that I, THOMAS J. CALLAHAN, a citizen of the United States, residing at Dayton, in the county of Montgomery and State of Ohio, have invented new and useful Improvements in Sill-Joints for Cut-to-Fit Greenhouses, of which the following is a specification.

This invention relates to new and useful improvements in sill joints for cut-to-fit greenhouses.

The principal object of my invention is to provide for cut-to-fit greenhouses or other building structures, a sill joint which is not only tight and sure but one which makes the joining of side and corner sills an easy and simple operation. The V joints which I employ in carrying out the object of the invention, slide readily into each other, and after insertion they are drawn, and held tightly, together by the adjustable means hereinafter to be described.

The preferred form of embodiment of my invention is illustrated in the accompanying drawings, of which Figure 1 is a perspective view of my improved joint applied to side sills. Fig. 2 is a perspective view of the same as applied to corner sills. And Fig. 3 is a transverse sectional view through two side sills secured together by my improved joint.

Throughout the specification and drawings, similar reference characters denote corresponding parts.

In a detailed description of the preferred form of embodiment of my invention, the numerals 1 and 2 designate respectively, two side sills adapted for use in a cut-to-fit greenhouse. (See Fig. 1.) For the purpose of readily joining them together, an edge of the sill 1 terminates in a V shaped tongue 3 which fits in a V groove 4 formed in the adjacent engaging edge of the side sill 2.

Formed in each of the side sills 1 and 2, near the adjacent engaging edges thereof, is a hole 5 wide and deep enough to receive a nut and washer to be hereinafter referred to. Each sill preferably contains slightly below its top surface at its middle portion, a longitudinal bore that extends from its hole 5 to its nearest outer edge, for the purpose of readily receiving one threaded end of a long rod 6. (See Figs. 1 and 3.) Before the sills are joined, one end of the rod 6 is inserted in the bore which leads to the hole 5 in the sill 1, or it may be first inserted in the sill 2 if desired. A washer 7 and a nut 8 may then be placed within the hole 5 in the sill 1 for application to the threaded end of the rod 6 as it enters said hole. The other threaded end of said rod is then inserted in the bore that leads to the hole 5 in the sill 2, where it receives a washer 9 and a knurled nut 10. The holes 5 are of sufficient length to permit the nuts and washers to be readily applied to their respective ends of the rod 6. By means of a hammer and a big nail or other pointed instrument, the nuts 8 and 10 may be readily turned on said rod to draw the V tongue in the one sill tightly into the V groove in the other sill to lock them firmly together.

The application of my improved joint to corner sills is illustrated in Fig. 2, where there is shown a corner sill 11 about to be joined to a corner sill 12. The corner sill 11 has provided along its inclined edge the tongue 3 adapted to enter the groove 4 formed in the adjacent inclined edge of the corner sill 12. Into the elongated bolt hole 5 provided in each sill near its inclined edge, there projects a threaded end of the rod 6 to receive the respective nuts and washers hereinbefore described. By turning these nuts with a hammer and nail, the sills 11 and 12 may be joined as tightly as the sills 1 and 2.

It will now be seen from the above description that I have provided a simple and effective method of joining the corner and side sills of cut-to-fit greenhouses or other building structures. The V joint coöperates with the threaded rod and nuts in insuring sure and firm joint, while the operation of drawing the sills together is made an easy and positive one by the use of simple tools. Accordingly, the veriest amateur can accomplish it.

I do not wish to be limited to the details of construction and operation herein shown and described, and any changes or modifications may be made therein within the scope of the subjoined claim.

Having described my invention, I claim:

In a device of the class described, a sill containing a nut-receiving hole near one end edge thereof, a V shaped tongue formed on said edge, a sill to be joined to the first named sill, having a similar hole near one of its end edges, a V shaped groove formed in said edge, each sill containing a bore extending from its respective nut-receiving hole through its nearest end edge, a rod having threaded ends adapted to be easily forced through said bores, and a nut within each nut-receiving hole for a ready application to its respective threaded end of said rod, to draw the V tongue of one sill tightly into the V groove of the other sill.

In testimony whereof I have hereunto set my hand this 2nd day of June, 1917.

THOMAS J. CALLAHAN.

Witnesses:
 HOWARD S. SMITH,
 WILLIAM B. HOUNELL.